(12) United States Patent
Flath et al.

(10) Patent No.: US 7,837,896 B2
(45) Date of Patent: Nov. 23, 2010

(54) POLYMERIC MATERIAL

(75) Inventors: Dianne Flath, Elswick (GB); Brian Wilson, Lancashire (GB)

(73) Assignee: Victrex Manufacturing Limited (GB)

( * ) Notice: Subject to any disclaimer, the term of this patent is extended or adjusted under 35 U.S.C. 154(b) by 171 days.

(21) Appl. No.: 11/910,196

(22) PCT Filed: Apr. 6, 2006

(86) PCT No.: PCT/GB2006/001260

§ 371 (c)(1),
(2), (4) Date: Apr. 30, 2008

(87) PCT Pub. No.: WO2006/106338

PCT Pub. Date: Oct. 12, 2006

(65) Prior Publication Data

US 2008/0315156 A1    Dec. 25, 2008

(30) Foreign Application Priority Data

Apr. 6, 2005    (GB) .................................. 0506934.9

(51) Int. Cl.
*C09K 19/00*    (2006.01)
*C09K 19/52*    (2006.01)

(52) U.S. Cl. ............................. 252/299.01; 252/299.1; 252/299.5; 428/1.1; 430/20

(58) Field of Classification Search ............ 252/299.01, 252/299.1, 299.5; 430/20; 428/1.1
See application file for complete search history.

(56) References Cited

U.S. PATENT DOCUMENTS

| 4,386,174 | A |   | 5/1983  | Cogswell et al. |         |
|-----------|---|---|---------|-----------------|---------|
| 4,438,236 | A | * | 3/1984  | Cogswell et al. | 525/165 |
| 5,900,453 | A |   | 5/1999  | Egami et al.    |         |
| 7,608,648 | B2| * | 10/2009 | Meakin et al.   | 523/220 |

FOREIGN PATENT DOCUMENTS

| JP | 60187530    | 9/1985  |
| JP | 3222722     | 10/1991 |
| JP | 8253671     | 10/1996 |
| WO | 2005030836 A| 4/2005  |

OTHER PUBLICATIONS

International Search Report dated Jul. 4, 2006 for International Application No. PCT/GB2006/001260.

* cited by examiner

*Primary Examiner*—Geraldina Visconti
(74) *Attorney, Agent, or Firm*—Barnes & Thornburg LLP; Mark J. Nahnsen

(57) ABSTRACT

A composition comprises a first polymeric material having a melt viscosity of 0.15 kNsm$^{-2}$ or less and liquid crystal polymer. The first polymeric material is preferably a polyaryletherketone. A composite material which comprises high levels of fillers in combination with the aforementioned composition is also described.

24 Claims, 1 Drawing Sheet

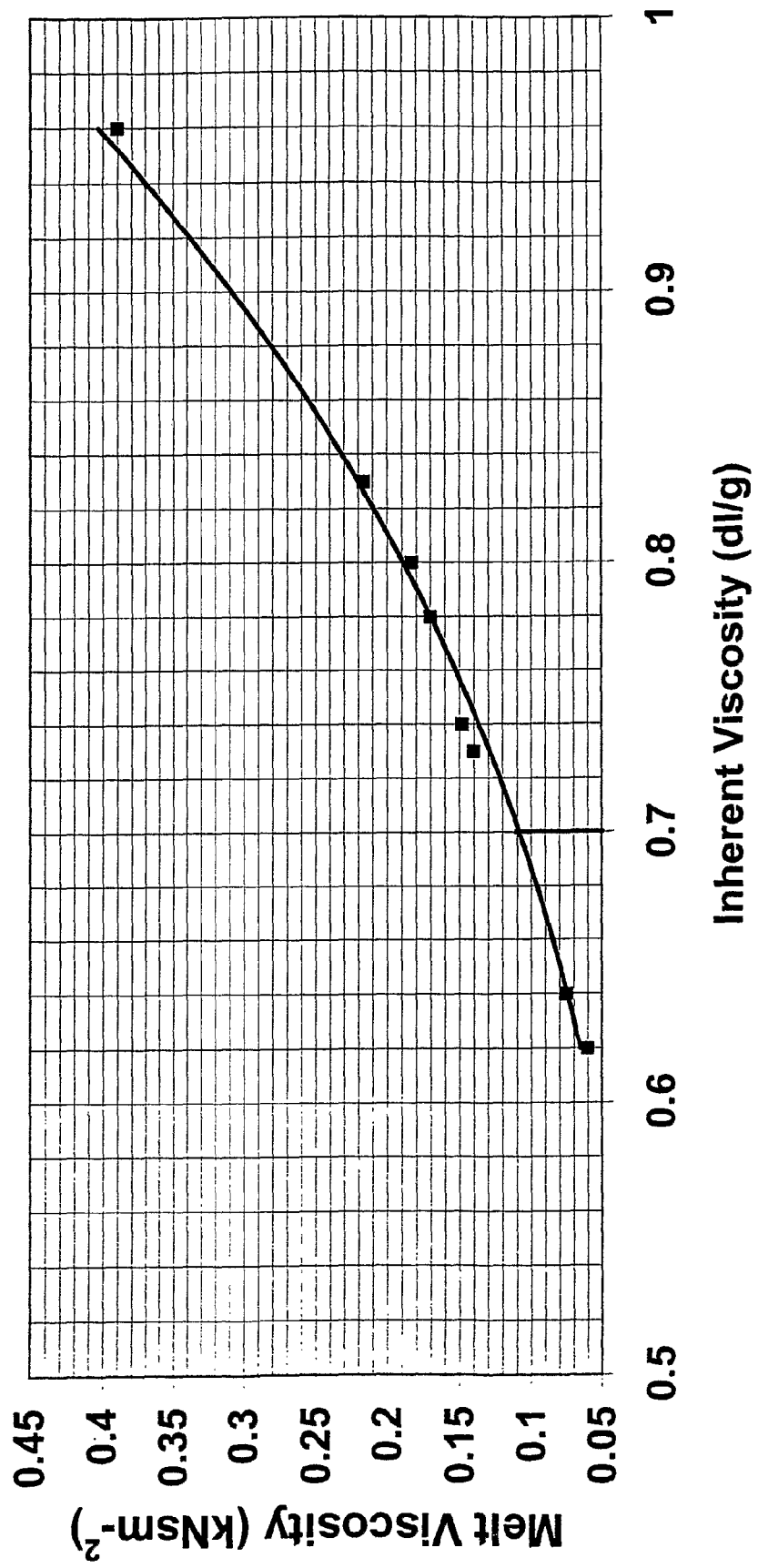

POLYMERIC MATERIAL

This invention relates to polymeric materials and particularly, although not exclusively, relates to compositions and composite materials which comprise a polymeric material.

It is well known to compound polymeric materials with fillers in order to provide composite materials having properties which are improved, at least in some respects, over the polymeric materials alone. For example, a polyaryletherketone such as polyetheretherketone is compounded with up to 30 wt % of glass fibres or carbon fibres. Such materials have been commercially available for many years from Victrex Plc under the names VICTREX PEEK 150GL30 and 150CA30 respectively. These materials include polyetheretherketone having an MV of 0.15 kNsm$^{-2}$ and 30 wt % of fibrous filler.

It is difficult to incorporate greater than 30 wt % of filler materials into a polymeric material such as polyetheretherketone because the molten composite is too viscous for standard melt processing equipment and/or due to difficulties in fully wetting out filler materials. These problems have been addressed in the prior art as discussed further below.

U.S. Pat. No. 4,541,884 (Cogswell) recognises the difficulties associated with achieving rapid impregnation of a fibre tow or roving if the viscosity of the melt of a polymer used is too high. The problem is solved by drawing a plurality of continuous filaments through a melt comprising a mixture of a thermoplastic polymer and a relatively high level of plasticizer for the polymer which is thermally stable but which can be volatilised from the composition. Use of the plasticizer plasticizes the polymer in the melt and gives a melt of reduced viscosity compared with the melt viscosity of the polymer alone. The document describes, in Example 1, the use of a mixture of polyetheretherketone (70 wt %) having a MV of 110 Ns/m$^2$ and diphenylsulphone (30 wt %) as plasticizer; and also in Example 3, the use of polyetheretherketone (100 parts by weight (pbw)) having a MV of 25 Ns/m$^2$, and diphenylsulphone (100 pbw). Fibre loadings as high as 69 wt % are described. Disadvantageously, use of the process described requires use (and disposal of) large amounts of plasticizer with consequential increased costs of the process.

U.S. Pat. No. 5,213,889 (Cogswell) solves the same problem by using a thermoplastic polymer having a very low melt viscosity, of less than 30 Ns/m$^2$ and preferably in the range 1 to 10 Ns/m$^2$ to enable wetting of the filaments. The disclosure envisages processing steps to increase the molecular weight of the polymer, after preparation of the composite, to improve its properties.

More recently, U.S. Pat. No. 5,844,036 (Hughes) has addressed the problem of providing highly filled composites of polyaryletherketones to improve their properties. The solution involves using a polyaryletherketone matrix and two types of fillers each said to provide unique properties. The first filler is a reinforcing filler which provides high strength and stiffness. The second filler is a non-thermoplastic immobilizing filler to immobilise the amorphous portion of the partially crystalline polyaryletherketone polymer and provide resistance to high temperature distortion. The document describes the use of polyetheretherketone grade PEEK™ 150FP from ICI Victrex which has an MV of 0.15 kNsm$^{-2}$. Disadvantageously, Hughes is limited in its application to the use of two different types of fillers having two specific properties described.

It is an object of the present invention to address problems associated with polymeric materials and particularly, although not exclusively, with filled composite materials.

According to a first aspect of the invention, there is provided a composition comprising first polymeric material having a melt viscosity (MV) of 0.15 kNsm$^{-2}$ or less and liquid crystal polymer (LCP), wherein said first polymeric material is of a type which includes: unsubstituted phenyl moieties, carbonyl moieties and ether moieties in the polymeric backbone of said first polymeric material.

MV is suitably measured using capillary rheometry operating at 400° C. at a shear rate of 1000 s$^{-1}$ using a tungsten carbide die, 0.5×3.175 mm.

Although the invention is described in terms of MV this may be equated approximately to IV (measured as described in EP0001879B) in accordance with FIG. 1 hereinafter.

Advantageously, the composition can be used to prepare useful composite materials having high loadings of fillers and the first polymeric material does not need to be caused to polymerise to increase its molecular weight after preparation of the composite. Additionally, no plasticiser is required to reduce the melt viscosity of the melt. Furthermore, a single type of filler or a plurality of conventional fillers can readily be blended with the first polymeric material to prepare a composite material.

Said first polymeric material suitably has a MV of at least 0.06 kNsm$^{-2}$, preferably has a MV of at least 0.07 kNsm$^{-2}$, more preferably at least 0.08 kNsm$^{-2}$, especially at least 0.09 kNsm$^{-2}$.

Said first polymeric material may have a MV of less than 0.15 kNsm$^{-2}$, preferably of less than 0.14 kNsm$^{-2}$, more preferably less than 0.13 kNsm$^{-2}$.

Said first polymeric material may have a MV in the range 0.07 to 0.15 kNsm$^{-2}$, suitably in the range 0.9 to 0.145 kNsm$^{-2}$, preferably in the range 0.11 to 0.14 kNsm$^{-2}$, more preferably in the range 0.12 to 0.14 kNsm$^{-2}$, especially in the range 0.13 to 0.14 kNsm$^{-2}$.

Said first polymeric material may have a tensile strength, measured in accordance with ASTM D790 of at least 80 MPa. The tensile strength is preferably in the range 80-110 MPa, more preferably in the range 80-100 MPa.

Said first polymeric material may have a flexural strength, measured in accordance with ASTM D790 of at least 145 MPa. The flexural strength is preferably in the range 145-180 MPa, more preferably in the range 145-165 MPa.

Said first polymeric material may have a flexural modulus, measured in accordance with ASTM D790, of at least 3.5 GPa. The flexural modulus is preferably in the range 3.5-4.5 GPa, more preferably in the range 3.5-4.1 GPa.

Preferably, said first polymeric material has a moiety of formula

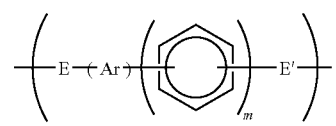

I and/or a moiety of formula

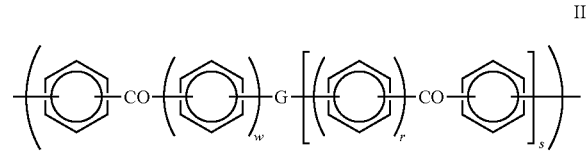

II wherein m, r, s and w independently represent zero or a positive integer, E and E' independently represent an oxygen atom or a direct link, G represents an oxygen atom, a direct link or a —O-Ph-O— moiety where Ph represents a phenyl group and Ar is selected from one of the following moieties (i) to (vi) which is bonded via one or more of its phenyl moieties to adjacent moieties

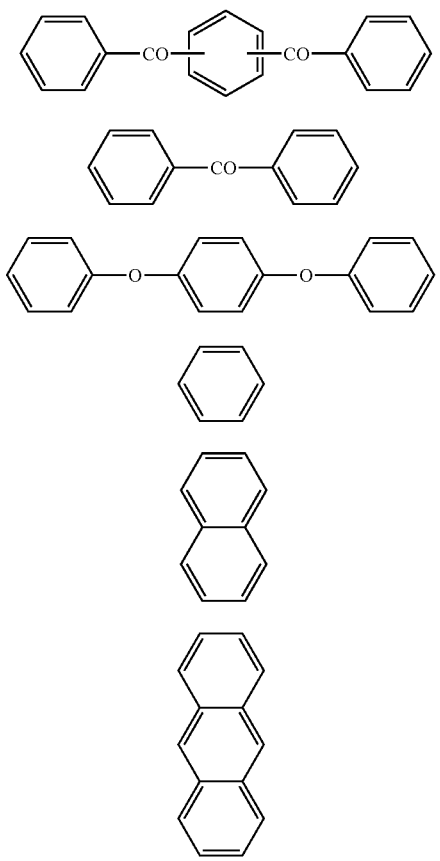

(i)
(ii)
(iii)
(iv)
(v)
(vi)

Unless otherwise stated in this specification, a phenyl moiety has 1,4-, linkages to moieties to which it is bonded.

In (i), the middle phenyl may be 1,4- or 1,3-substituted. It is preferably 1,4-substituted.

Said first polymeric material may include more than one different type of repeat unit of formula I; and more than one different type of repeat unit of formula II. Preferably, however, only one type of repeat unit of formula I or II is provided.

Said moieties I and II are suitably repeat units. In the first polymeric material, units I and II are suitably bonded to one another—that is, with no other atoms or groups being bonded between units I and II.

Where w is greater than zero, the respective phenylene moieties may independently have 1,4- or 1,3-linkages to the other moieties in the repeat units of formulae II. Preferably, said phenylene moieties have 1,4-linkages.

Suitably, "a" represents the mole % of units of formula I in said first polymeric material, suitably wherein each unit I is the same; and "b" represents the mole % of units of formula II in said first polymeric material, suitably wherein each unit II is the same. Preferably, a is in the range 45-100, more preferably in the range 45-55, especially in the range 48-52. Preferably, b is in the range 0-55, more preferably in the range 45-55, especially in the range 48-52. Preferably, the ratio of a to b is in the range 0.9 to 1.1 and, more preferably, is about 1. Suitably, the sum of a and b is at least 90, preferably at least 95, more preferably at least 99, especially about 100. Preferably, said first polymeric material consists essentially of moieties I and II.

Said first polymeric material may be a homopolymer having a repeat unit of general formula

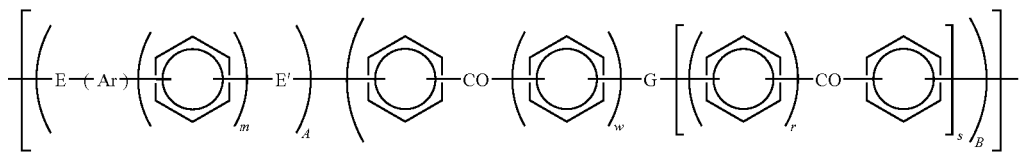

IV or a random or block copolymer of at least two different units of IV, wherein A and B independently represent 0 or 1 and E, E', G, Ar, m, r, s and w are as described in any statement herein.

As an alternative to a first polymeric material comprising unit(s) IV discussed above, said polymeric material may be a homopolymer having a repeat unit of general formula

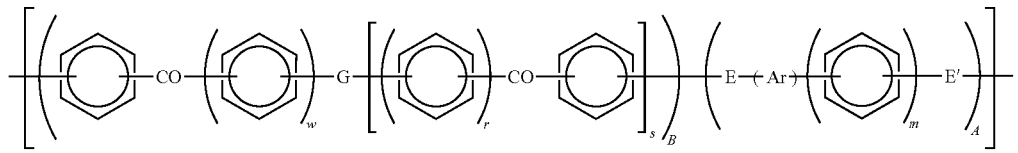

IV* or a random or block copolymer of at least two different units of IV* wherein A and B, independently represent 0 or 1 and E, E', G, Ar, m, r, s and w are as described in any statement herein.

Preferably, m is in the range 0-3, more preferably 0-2, especially 0-1. Preferably, r is in the range 0-3, more preferably 0-2, especially 0-1. Preferably, s is 0 or 1. Preferably, w is 0 or 1.

Preferably, said first polymeric material is a homopolymer having a repeat unit of general formula IV.

Preferably Ar is selected from the following moieties (vii) to (xiii):

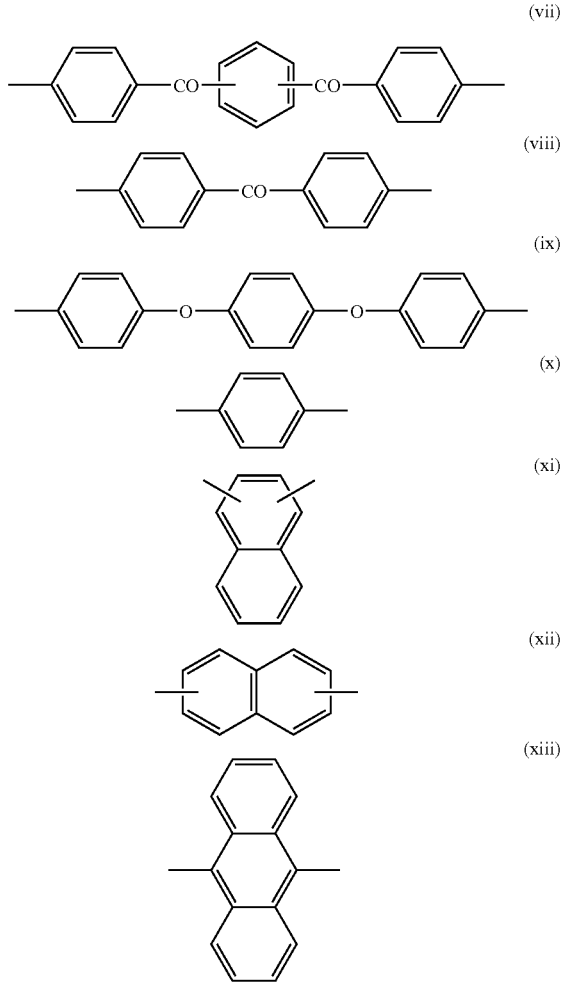

In (vii), the middle phenyl may be 1,4- or 1,3-substituted. It is preferably 1,4-substituted.

Preferably, (xi) is selected from a 1,2-, 1,3-, or a 1,5- moiety; and (xii) is selected from a 1,6-, 2,3-, 2,6- or a 2,7- moiety.

Suitable moieties Ar are moieties (i), (ii), (iii) and (iv) and, of these, moieties (i), (ii) and (iv) are preferred. Other preferred moieties Ar are moieties (vii), (viii), (ix) and (x) and, of these, moieties (vii), (viii) and (x) are especially preferred.

An especially preferred class of first polymeric materials are polymers (or copolymers) which consist essentially of phenyl moieties in conjunction with ketone and/or ether moieties. That is, in the preferred class, the first polymeric material does not include repeat units which include —S—, —SO$_2$— or aromatic groups other than phenyl. Preferred first polymeric materials of the type described include:

(a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (i), m represents 0, A represents 1, B represents 0 (i.e. polyetherketone);

(c) a polymer consisting essentially of units of formula IV wherein E represents an oxygen atom, Ar represents moiety (i), m represents 0, E' represents a direct link, A represents 1, B represents 0, (i.e. polyetherketoneketone).

(d) a polymer consisting essentially of units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).

(e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).

(f) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

Said first polymeric material is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity in said first polymeric material may be at least 1%, suitably at least 3%, preferably at least 5% and more preferably at least 10%. In especially preferred embodiments, the crystallinity may be greater than 30%, more preferably greater than 40%, especially greater than 45%.

The glass transition temperature ($T_g$) of said first polymeric material may be at least 140° C., suitably at least 144° C. In some cases it may be greater than 154° C., 160° C., 164° C., 170° C., 190° C. or greater than 250° C. or even 300° C. In a preferred embodiment, the glass transition temperature is in the range 140° C. to 145° C.

The main peak of the melting endotherm (Tm) for said first polymeric material (if crystalline) may be at least 300° C.

Said first polymeric material may consist essentially of one of units (a) to (f) defined above. Alternatively, said first polymeric material may comprise a copolymer comprising at least two units selected from (a) to (f) defined above. Preferred copolymers include units (a). For example, a copolymer may comprise units (a) and (f); or may comprise units (a) and (e).

Said first polymeric material preferably comprises, more preferably consists essentially of, a repeat unit of formula

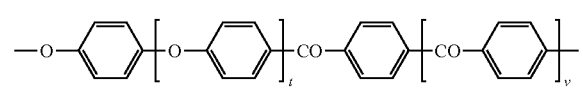

where t and v independently represent 0 or 1. Preferred polymeric materials have a said repeat unit wherein either t=1 or v=0; t=0 and v=0; or t=0 and v=1. More preferred have t=1 and v=0; or t=0 and v=0. The most preferred has t=1 and v=0.

In preferred embodiments, said first polymeric material is selected from polyetheretherketone, polyetherketone and polyetherketoneketone. In a more preferred embodiment, said first polymeric material is selected from polyetherketone and polyetheretherketone. In an especially preferred embodiment, said first polymeric material is polyetheretherketone.

Said liquid crystal polymer is suitably an anisotropic melt forming polymer which means it transmits light when examined between crossed polaroids. Such polymers are also termed "thermotropic liquid crystal polymers".

Said liquid crystal polymer may be a substantially linear polymer which incorporates sequences of rigid units or a linear vinyl polymer having pendant groups which are sufficiently stiff to allow formation of an anisotropic melt. Examples of liquid crystal polymers are described in U.S. Pat. No. 4,161,470, U.S. Pat. No. 4,083,829, U.S. Pat. No. 3,778,410, U.S. Pat. No. 4,067,852, U.S. Pat. No. 404,148 and U.S. Pat. No. 4,272,625, the contents of which are incorporated herein by reference insofar as they relate to the nature of the liquid crystal polymer.

Said liquid crystal polymer suitably has a melting point of greater than 250° C., preferably greater than 275° C., more preferably greater than 300° C., especially greater than 340° C. The meeting point is preferably less than 390° C.

The ratio of the wt % of said first polymeric material to the wt % of said LCP may be at least 3.5, suitably at least 5, preferably at least 7.5, more preferably at least 10 and especially at least 15. Advantageously it is found that the combination of a said first polymeric material as described and relatively low amounts of LCP can produce compositions which have good mechanical and chemical properties without the need to effect any post reaction to cause any increase in molecular weight of the first polymeric material and, furthermore, such compositions can be used to produce composite materials having a high loading of fillers and excellent chemical and mechanical properties.

The ratio of the wt % of said first polymeric material to the wt % of said LCP may be less than 100, suitably less than 80, preferably less than 40, more preferably less than 25, especially less than 20.

The ratio of the wt % of said first polymeric material to the wt % of said LCP is suitably in the range 3.5 to 100, preferably 3.5 to 50, more preferably 2.5 to 25, especially 7.5 to 25.

Said composition may include at least 25 wt %, preferably at least 30 wt %, more preferably at least 35 wt % of said first polymeric material; and at least 1 wt %, preferably at least 2 wt %, more preferably at least 3 wt % of said LCP.

The composition may include more than one first polymeric material having MV as described in which case the amounts and/or ratios referred to herein may be calculated on the basis of the sum of the amounts of all first polymeric material having MV as described. Similarly, the composition may include more than one LCP as described, in which case the amounts and/or ratios referred to herein may be calculated on the basis of the sum of the amounts of all LCPs having MV as described.

Said composition preferably includes a single type of first polymeric material. Said composition preferably includes a single type of LCP.

Said composition may include 80 to 95 wt % of said first polymeric material and 5 to 20 wt % of LCP; or it may include 85 to 95 wt % of said first polymeric material and 5 to 15 wt % of LCP.

Said composition may be provided in a particulate form, for example in a powder or granular form. The particulate form may comprise particles having an average weight of at least 0.05 mg, suitably at least 0.1 mg, preferably at least 0.2 mg, more preferably at least 0.5 mg, especially at least 1.0 mg. The average weight may be less than 10 mg, preferably less than 5 mg. The particulate form suitably has an average weight in the range 0.005 to 10 mg preferably 0.5 to 5 mg.

The particulate form may have an average volume in the range 1 to 100 mm$^3$, suitably 5 to 100 mm$^3$, preferably 10 to 50 mm$^3$, more preferably 15 to 35 mm$^3$.

According to a second aspect of the invention, there is provided a pack comprising a composition according to said first aspect.

Said pack may include at least 1 kg, suitably at least 5 kg, preferably at least 10 kg, more preferably at least 14 kg of said composition. Said pack may include 1000 kg or less, preferably 500 kg or less of said composition. Preferred packs include 10 to 500 kg of said composition.

Said pack may include at least 1000, suitably at least 10,000, preferably at least 50,000, more preferably at least 100,000 particles of said composition in particulate form. The pack may include less than 1,000,000 particles of said composition in particulate form.

Said pack may include a composite material as described hereinafter which includes a said composition.

Material in said pack (e.g. a composite material or a said composition per se) may be in powder or granular form.

Said pack may comprise packaging material (which is intended to be discarded or re-used) and a desired material (e.g. a composite material and/or a said composition). Said packaging material preferably substantially fully encloses said desired material. Said packaging material may comprise a first receptacle, for example a flexible receptacle such as a plastics bag in which said desired material is arranged. The first receptacle may be contained within a second receptacle for example in a box such as a cardboard box.

According to a third aspect of the invention, there is provided a composite material comprising a said first polymeric as described according to said first aspect, a LCP as described according to said first aspect and a filler means. Said composite material suitably comprises said composition of said first aspect and a said filler means.

Said filler means may include a fibrous filler or a non-fibrous filler. Said filler means may include both a fibrous filler and a non-fibrous filler.

A said fibrous filler may be continuous or discontinuous. In preferred embodiments a said fibrous filler is discontinuous.

A said fibrous filler may be selected from inorganic fibrous materials, non-melting and high-melting organic fibrous materials such as aramid fibres and carbon fibre.

A said fibrous filler may be selected from glass fiber, carbon fibre, asbestos fiber, silica fiber, alumina fiber, zirconia fiber, boron nitride fiber, silicon nitride fiber, boron fiber, fluorocarbon resin fibre and potassium titanate fiber. Preferred fibrous fillers are glass fibre and carbon fibre.

A fibrous filler may comprise nano fibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, carbon black, nanotubes and barium sulfate. The non-fibrous fillers may be introduced in the form of powder or flaky particles.

The composite material may be in a particulate form for example into pellets or granules. Pellets or granules may have a maximum dimension of less than 10 mm, preferably less than 7 mm, more preferably less than 4 mm.

Preferably, said filler means comprises one or more fillers selected from glass fibre, carbon fibre, carbon black and a fluorocarbon resin. More preferably, said filler means comprises glass fibre or carbon, especially discontinuous, for example chopped, glass fibre or carbon fibre.

Said composite material may comprise one or more different first polymeric materials as described above with MV as described. Preferably, said composite material comprises only a single type of first polymeric material. Said single type is preferably polyetheretherketone.

Said composite material suitably includes 70 wt % or less, suitably 65 wt % or less, preferably 55 wt % or less, more preferably 45 wt % or less, especially 40 wt % or less of said first polymeric material (especially polyetheretherketone). Said composite material suitably includes at least 20 wt %, preferably at least 25 wt %, more preferably at least 30 wt % of filler means. Said composite material suitably includes at least 35 wt %, preferably at least 45 wt %, more preferably at least 50 wt %, especially at least 55 wt % of filler means which may include different types of fillers (in which case the wt % refers to the sum of the wt % of each filler present), but preferably comprises a single type of filler. The amount of filler means may be less than 75 wt %.

Said composite material suitably includes 25 to 69.5 wt % of first polymeric material having a MV as described, (which is preferably a single type of polymeric material, especially polyetheretherketone), 30 to 74.5 wt % of filler means and up to 10 wt % of LCP. Preferably, said composite material comprises 25 to 49.5 wt % of first polymeric material, 50 to 74.5 wt % of filler means and 0.5 to 7.5 wt % of LCP. More preferably, said composite material comprises 30 to 44.5 wt % of first polymeric material, 55 to 69.5 wt % of filler means and 0.5 to 5 wt % of LCP.

Said composite material preferably consists essentially of first polymeric material, filler means and LCP.

In the composite material, the preferred ratios of said first polymeric material to LCP may be as described in accordance with said first aspect. The ratio of filler means to said first polymeric material may be at least 1, suitably at least 1.2, preferably at least 1.4. The ratio may be less than 2.0. The ratio of filler means to LCP may be at least 5, suitably at least 8, preferably at least 10. The ratio may be less than 60, preferably less than 45, more preferably less than 30.

Said composite material suitably includes a low level of Group I or Group II metal ions. Said composite material suitably includes less than 1000 ppm, preferably less than 500 ppm, more preferably less than 150 ppm of any alkali metal cation (e.g. $Na^+$, $Li^+$ or $K^+$) in it, said ppm being based on the amount of said polymeric material in said composite. Said composite material suitably includes less than 1000 ppm, preferably less than 500 ppm, more preferably less than 150 ppm of any Group II metal cation (e.g. $Ca^{2+}$) in it, said ppm being based on the amount of said polymeric material(s) in said composite. Preferably, the sum of the ppm's of all Group I and Group II metal cations in said composite material is less than 2000 ppm, preferably less than 1000 ppm, more preferably less than 500 ppm, especially less than 250 ppm.

The levels of ions in ppm described may be assessed using ICPAES (Inductive Coupling Plasma Atomic Emission Spectroscopy).

According to a fourth aspect of the invention, there is provided a method of preparing a composition according to said first aspect, said method comprising:

(i) selecting a first polymeric material having a MV of less than 0.15 $kNsm^{-2}$;

(ii) contacting said first polymeric material with an LCP;

wherein said first polymeric material and LCP are as described according to said first aspect.

In the method at least 1 Kg, preferably at least 5 Kg, more preferably at least 10 Kg, especially at least 25 Kg of said first polymeric material is selected. In the method, at least 0.1 Kg, preferably at least 0.5 Kg, more preferably at least 1 Kg, especially at least 2.5 Kg of said LCP means is selected.

Suitably at least 5 Kg (preferably at least 10 Kg, especially at least 25 Kg) of said first polymeric material is selected and contacted with at least 0.5 Kg (preferably at least 1 Kg, especially at least 2.5 Kg) of said LCP.

In the method a batch of said composition may be prepared having a weight of at least 10 kg, preferably at least 20 kg, especially at least 50 kg.

The method may comprise forming said composition into a particulate form, for examples granules or pellets. The particulate form may comprise particles having an average weight of at least 0.5 mg, preferably at least 1.0 mg, more preferably at least 1.5 mg. The average weight may be less than 100 mg, suitably less than 60 mg, preferably less than 40 mg.

The mass of composite material in said particulate form may be provided in a pack. Said pack may contain at least 10,000, suitably at least 50,000, preferably at least 250,000 particles of said composite material in said particulate form. The pack may contain less than 1,000,000 particles.

In the method, said first polymeric material and said LCP may be melt blended, suitably by extrusion and an extrudate is suitably treated to define particles (e.g. pellets or granules) of said composition.

According to a fifth aspect of the invention, there is provided a method of preparing a composite material according to the third aspect, said method comprising:

(i) selecting a first polymeric material having an MV of less than 0.15 $kNsm^{-2}$ or a composition according to said first aspect and/or prepared as described according to said fourth aspect;

(ii) optionally, contacting the materials referred to in (i) with a LCP;

(iii) contacting said materials referred to in (i) or (ii) with a filler means;

wherein said composition, said first polymeric material, said LCP and said filler means are as described according to said first to fourth aspects.

In the method at least 1 kg, preferably at least 5 Kg, more preferably at least 10 Kg, especially at least 25 Kg of said first polymeric material or said composition according to the first aspect is selected. In the method, at least 1 Kg, preferably at least 5 Kg, more preferably at least 10 Kg, especially at least 25 kg of said filler means is selected.

Suitably at least 5 kg (preferably at least 10 kg, especially at least 25 kg) of said first polymeric material or said composition according to the first aspect is selected and contacted with at least 5 kg (preferably at least 10 kg, especially at least 25 kg) of said filler means.

In the method a batch of composite material may be prepared having a weight of at least 10 kg, preferably at least 20 kg, especially at least 50 kg.

The method may comprise forming said composite material into a particulate form, for examples granules or pellets. The particulate form may comprise particles as described according to the fourth aspect.

The mass of composite material in said particulate form may be provided in a pack. Said pack may contain particles as described for said fourth aspect.

Said composite material could be prepared as described in PCT/GB2003/001872, the contents of which are incorporated herein by reference. Preferably, in the method, said first polymeric material or said composition are selected and mixed with said filler means at an elevated temperature, suitably at a temperature at or above the melting temperature of said first polymeric material and LCP. It said first polymeric material and LCP are added separately, the LCP a preferably added before contact with said filler means. Thus, suitably, said first polymeric material and filler means are mixed whilst the first polymeric material and LCP are molten. Said elevated temperature is suitably below the decomposition temperature of the first polymeric material and LCP. Said elevated temperature is preferably at or above the main peak of the melting endotherm (TM) for said polymeric material and for said LCP. Said elevated temperature is preferably at least 300° C. and more preferably is at least 350° C. Advantageously, the molten first polymeric material and LCP can readily wet the filler and/or penetrate consolidated fillers, such as fibrous mats or woven fabrics, so the composite material prepared comprises the first polymeric material, LCP and filler means which is substantially uniformly dispersed throughout the first polymeric material and LCP.

The composite material may be prepared in a substantially continuous process. In this case first polymeric material or said composition may be constantly fed concurrently with a stream of filler means to a location wherein they are mixed and heated. An example of such a continuous process is extrusion. Another example (which may be particularly relevant wherein the filler means comprises a fibrous filler) involves causing a continuous filamentous mass to move through a melt comprising said polymeric material and LCP. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass.

Alternatively, the composite material may be prepared in a discontinuous process. In this case, a predetermined amount of said first polymeric material and LCP and a predetermined amount of said filler means may be selected and contacted and a composite material prepared by causing the first polymeric material and LCP to melt and causing the first polymeric material, LCP and filler means to mix to form a substantially uniform composite material.

A mixture, prepared after contacting said first polymeric material, LCP and said filler means suitably includes less than 1 wt %, preferably less than 0.9 wt %, more preferably less than 0.7 wt %, especially less than 0.5 wt % of a plasticizer (of a type which is liquid at less than 150° C., preferably at less than 100° C.) for the first polymeric material (e.g. a liquid which will enable a melt to be obtained from a said first polymeric material having a lower melt viscosity than that of the polymeric material alone measured under the same conditions), for example an organic liquid, for example solvent such as diphenylsulphone. Preferably, in the method, substantially no liquid plasticizer, for example diphenylsulphone, is added to either the first polymeric material, said composition or a mixture comprising said polymeric material.

A mixture, prepared after contacting said first polymeric material, LCP and said filler means, suitably includes less than 0.005 parts by weight (pbw) of an alkaline salt of a Group I or Group II metal per 100 pbw of said polymeric material. Said mixture preferably does not include any salt present at concentrations of greater than 0.005 pbw per 100 pbw of said polymeric material. Preferably, said mixture includes less than 0.004 pbw, more preferably less than 0.003 pbw, especially less than 0.001 pbw. Preferably, no salt, for example an alkaline salt of a Group I or Group II metal, is added to the mixture or any component thereof used to make the composite material in the method.

The composite material may advantageously be used in injection moulding or extrusion to manufacture components. Thus, according to a sixth aspect of the invention, there is provided a method of making a component, the method comprising extruding or injection moulding a composite material as described according to the third and/or fifth aspects.

Said composite material may have any feature of said composite material described according to any of the above aspects.

Said method preferably involves selecting a precursor material from which to make the component wherein said precursor material comprises a said composite material and subjecting the precursor material to a temperature to melt polymeric material in said composite material in an extrusion or injection moulding apparatus. Suitably, said precursor material is heated to a temperature of greater than 300° C., preferably greater than 340° C. It is suitably heated to a temperature not exceeding 450° C.

Said precursor material may consist essentially of a said composite material described herein.

Suitably, in the method, at least 0.5 g, preferably at least 1 g, more preferably at least 5 g, especially at least 12 g is selected in order to make the component.

The method may be used to make components having relatively thin walls. Thus, the invention, in a seventh aspect relates to a method of making a component which has a wall which includes a region having a thickness of 3 mm or less, the method comprising:

(A) selecting a precursor material as described according to the third aspect.

AND (B) treating said precursor material, thereby to form said component.

Preferably, the component includes a region having a thickness of 2 mm or less, more preferably 1 mm or less.

Said treatment described in (B) preferably involves melt processing said precursor material. Melt processing is preferably carried out by extrusion or injection moulding.

Suitably, said component includes a region having an area of at least 0.5 cm$^2$, preferably at least 1 cm$^2$, more preferably at least 5 cm$^2$ having a thickness as described. Thus, in one embodiment, said component may include a region of at least 0.5 cm$^2$ which has a thickness of 3 mm, preferably of 2 mm or less.

A said first polymeric material as described herein may be made by any suitable method. An electrophilic process may be used as described in U.S. Pat. No. 6,566,484B2; or a nucleophilic process may be used as described in EP00001879B or PCT/GB99/02833. A nucleophilic process is preferred.

MV may be controlled as described in EP 0001879B.

Any feature of any aspect of any invention or embodiment described herein may be combined with any feature of any aspect of any other invention or embodiment described herein mutatis mutandis.

Specific embodiments of the invention will now be described by way of example, with reference to the accompanying FIGURE which is a plot illustrating the relationship between MV and IV.

VICTREX PEEK™ 150P (Trade Mark) may be obtained from Victrex Plc, UK.

All chemicals referred to herein were used as received from Sigma-Aldrich Chemical Company, Dorset, UK, unless otherwise stated.

EXAMPLE 1

Preparation of Polyetheretherketone

A 250 ml flanged flask fitted with a ground glass Quickfit lid, stirrer/stirrer guide, nitrogen inlet and outlet was charged with 4,4'-difluorobenzophenone (22.48 g, 0.103 mole), hydroquinone (11.01 g, 0.1 mole) and diphenylsulphone (49 g) and purged with nitrogen for over 1 hour. The contents were then heated under a nitrogen blanket to between 140 and 150° C. to form an almost colourless solution. While maintaining a nitrogen blanket, dried sodium carbonate (10.61 g, 0.1 mole) and potassium carbonate (0.278 g, 0.002 mole) was added. The temperature was raised to 200° C. and held for 1 hour; raised to 250° C. and held for 1 hour; raised to 315° C. and maintained for 2 hour.

The reaction mixture was allowed to cool, milled and washed with acetone and water. The resulting polymer was dried in an air oven at 120° C. producing a powder. The polymer had a melt viscosity at 400° C., 1000 sec$^{-1}$ of 0.089 kNsm$^{-2}$.

The polymer was compression moulded at 400° C. in a press (20 tonnes, 5 minutes) into a thin film approximately 0.2 mm thick and cooled from 400° C. to 120° C. in 30 minutes to induce complete crystallisation and then allowed to cool to room temperature.

The film was then hinged through 180° followed by hinging through 360° C. This process was repeated 5 times and the film survived without breaking and was therefore considered to be tough.

EXAMPLE 2a-d

Preparation of Samples of Polyetheretherketone with Different Melt Viscosities

The procedure described in Example 1 was repeated except the polymerisation time was varied to produce polyetheretherketone with different melt viscosities. The details are given in Table 1 below.

TABLE 1

| Example | Reaction Time (mins) | Melt Viscosity (kNsm$^{-2}$) | Toughness Test |
|---|---|---|---|
| 1 | 120 | 0.089 | Tough |
| 2a | 180 | 0.150 | Tough |
| 2b | 160 | 0.117 | Tough |
| 2c | 90 | 0.075 | Brittle |
| 2d | 60 | 0.06 | Brittle |

EXAMPLE 3

Large Scale Production of Polyetheretherketone

The procedure described in Example 1 was repeated on a larger scale to produce sufficient material to carry out mechanical and melt flow testing. Five batches were produced, Examples 3a-e, with Melt Viscosities measured at 400° C. and 1000 s$^{-1}$ of 0.144, 0.110 0.089, 0.076 and 0.059 kNsm$^{-2}$ respectively.

EXAMPLE 4a-d

Melt Flow Index of Polyetheretherketones

The Melt Flow Index of the polyetheretherketone samples from Examples 3c, 3e, a sample of Victrex PEEK™ 150P and blends of Examples 3d and 3a in a weight ratio of 77:23 and Examples 3e and 3a in a weight ratio of 64:36 were measured on a CEAST Melt Flow Tester 6941.000. The polymer was placed in the barrel of the Melt Flow Tester apparatus and heated to 400° C. The polymer was then extruded under a constant shear stress by inserting a weighted piston (2.16 kg) into the barrel and extruding through a tungsten carbide die, 2.095 mmbore×8.000 mm. The MFI (Melt Flow Index) is the average mass of polymer (in g) extruded in 10 min. The results are detailed in Table 2 below.

TABLE 2

| Example | Polyetheretherketone Sample | Melt Viscosity (kNsm$^{-2}$) | Melt Flow Index (g/10 mins) |
|---|---|---|---|
| 4a | Example 3c | 0.089 | 87 |
| 4b | Example 3e | 0.059 | 117 |
| 4c | Example 3d (77 wt %) + Example 3a (23 wt %) | 0.09 | 83 |
| 4d | Example 3e (64 wt %) + Example 3a (36 wt %) | 0.09 | 78 |
| 4e | Victrex PEEK ™ 150P | 0.150 | 41 |

EXAMPLE 5

Preparation of Polyetherketone

A 250 ml flanged flask fitted with a ground glass Quickfit lid, stirrer/stirrer guide, nitrogen inlet and outlet was charged with 4,4'-difluorobenzophenone (33.49 g, 0.153 mole), 4,4'-dihydroxybenzophenone (32.13 g, 0.150 mole) and diphenylsulphone (124.5 g) and purged with nitrogen for over 1 hour. The contents were then heated under a nitrogen blanket to 160° C. to form an almost colourless solution. While maintaining a nitrogen blanket, dried sodium carbonate (16.59 g, 0.156 mole) was added. The temperature was raised to 340° C. at 1° C./min and held for 2 hour.

The reaction mixture was allowed to cool, milled and washed with acetone and water. The resulting polymer was dried in an air oven at 120° C. producing a powder. The polymer had a melt viscosity at 400° C., 1000 sec-1 of 0.12 kNsm$^{-2}$.

EXAMPLE 6a-6d

Large Scale Production of Polyetherketone

The procedure described in Example 5 was repeated on a larger scale to produce sufficient material to carry out mechanical and melt flow testing. Four batches were produced, Examples 6a-d, with Melt Viscosities measured at 400° C. and 1000 s$^{-1}$ of 0.12, 0.10 0.09 and 0.08 kNsm$^{-2}$ respectively.

EXAMPLE 7a-7i

Viscosity and Mechanical Properties of Highly Filled, Low Viscosity Polyetheretherketones The polyetheretherketone from the 64:36 wt % blend of Example 3e and 3a was compounded with 0, 3, 6, 9 and 12% of a liquid crystal polymer (LCP) polymer (Ticona T130, melt point 370° C., glass content 30%), and with additional glass fibre (Owens Corning D165-11C) to obtain total glass content 60 wt %, on a ZSK 25 WLE Twin Screw Extruder, Examples 7a-7e respectively. The LCP polymer was predried 16 hours at 150° C. before compounding. The addition of LCP T130 was observed to decrease the extruder torque and to improve fibre wet out.

Comparative trials were carried out with Victrex 150P polyketone compounded with 0, 5, 10 and 15% of LCP T130 and with additional glass fibre to make the total glass content 30 wt %; Examples 7f-7i respectively.

The Melt Viscosity of the compounds was determined at 380° C. and 1000 s$^{-1}$, and the Melt Flow Index at 380° C. and 2.16 kg.

Compounds Example 7a-i were injection moulded using a barrel temperature of 350-360° C., nozzle temperature 365° C., mould temperature 145-155° C., holding pressure 30 Bar and a screw speed of 45 rpm into standard test pieces and their mechanical properties determined. The results are detailed in the tables below.

TABLE 12a

| Example | PEEK (wt %) | LCP T130 (wt %) | Glass Fibre (wt %) | LCP in recipe, pphr | ZSK 25 torque % | Melt Flow Index, 380° C. (g/10 min) | Melt Viscosity 380° C. (kNsm$^{-2}$) |
|---|---|---|---|---|---|---|---|
| 7a | 40$^{(a)}$   | 0  | 60   | 0     | 74 | 7.8 | 0.51 |
| 7b | 37.9$^{(a)}$ | 3  | 59.1 | 5.25  | 57 | 7.4 | 0.29 |
| 7c | 35.8$^{(a)}$ | 6  | 58.2 | 10.5  | 50 | 5.5 | 0.26 |
| 7d | 33.7$^{(a)}$ | 9  | 57.3 | 15.75 | 50 | 5.3 | 0.23 |
| 7e | 31.6$^{(a)}$ | 12 | 56.4 | 21    | 50 | 5.1 | 0.21 |
| 7f | 70$^{(b)}$   | 0  | 30   | 0     | 65 | 8.5 | 0.33 |
| 7g | 66.5$^{(b)}$ | 5  | 28.5 | 5     | 45 | 9.5 | 0.30 |
| 7h | 63$^{(b)}$   | 10 | 27   | 10    | 39 | 9.6 | 0.20 |
| 7i | 59.5$^{(b)}$ | 15 | 25.5 | 15    | 34 | 9.1 | 0.19 |

$^{(a)}$PEEK sample Blend 3e(64 wt %) + 3a(36 wt %)
$^{(b)}$Victrex PEEK 150P

TABLE 12b

| Example | Tensile Strength (MPa)$^{(a)}$ | Flexural Strength (MPa)$^{(b)}$ | Flexural Modulus (GPa)$^{(b)}$ | Notched Izod kJ/m$^2$ $^{(c)}$ | Unnotched Izod kJ/m$^2$ $^{(c)}$ |
|---|---|---|---|---|---|
| 7a | 230 | 342 | 20.6 | 10.5 | 50.1 |
| 7b | 234 | 349 | 21.2 | 14.0 | 52.9 |
| 7c | 235 | 340 | 21.3 | 12.8 | 48.9 |
| 7d | 212 | 323 | 21.3 | 12.5 | 45.6 |
| 7e | 216 | 325 | 21.2 | 12.4 | 45.8 |
| 7f | 174 | 265 | 9.8  | 9.1  | 60.4 |
| 7g | 168 | 232 | 10.1 | 8.6  | 43.3 |
| 7h | 163 | 231 | 10.4 | 7.3  | 38.6 |
| 7i | 156 | 221 | 10.6 | 7.5  | 40.0 |

$^{(a)}$ISO 527
$^{(b)}$ISO 178-1993(E)
$^{(c)}$ISO 180

The addition of LCP at relatively low levels to blends of polyetheretherketone and fibres produces a surprisingly large reduction in melt viscosity of the composite which allows the preparation and processing of highly filled composites. For example, if one compares Examples 7a and 7b, it will be noted that for substantially the same levels of fibres (about 60 wt %), the melt viscosity of the composite having a relatively low level of LCP (about 2 wt %) is reduced by over 40%. Comparing Examples 7f and 7 g it will be noted that adding LCP to material having a relatively high MV results in a MV drop of less than 10%.

Also, comparing Examples 7b and 7 g, it will be noted that there is a large difference in the levels of glass fibre which can be incorporated into composite materials having about the same MVs—about 60 wt % for composites comprising relatively low MV polyetheretherketone; but less than 30 wt % for composites comprising relatively high MV polyetheretherketone.

Furthermore, mechanical properties of composites made using relatively low MV polyetheretherketone are found to be excellent.

By processes analogous to those described in Example 7, relatively low MV polyetherketone as described in Examples 5 and 6 can also be shown to be surprisingly advantageous.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composition comprising at least 30 wt % of a first polymeric material having a melt viscosity (MV) of less than 0.15 kNsm$^{-2}$ and at least 1 wt % of a liquid crystal polymer (hereinafter "said LCP"), wherein said first polymeric material includes: unsubstituted phenyl moieties, ketone moieties and ether moieties in the polymeric backbone of said first polymeric material.

2. A composition according to claim 1, wherein said first polymeric material has an MV of at least 0.08 kNsm$^{-2}$ and less than 0.13 kNsm$^{-2}$.

3. A composition according to claim 1, wherein said first polymeric material is a polymer or copolymer which consists essentially of phenyl moieties in conjunction with ketone and/or ether moieties.

4. A composition according to claim 1, wherein said first polymeric material consists essentially of a repeat unit of formula

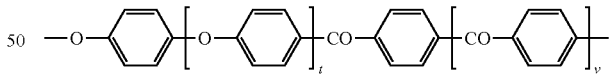

where t and v independently represent 0 or 1.

5. A composition according to claim 1, wherein said first polymeric material is polyetheretherketone.

6. A composition according to claim 1, wherein said LCP is an anisotropic melt forming polymer.

7. A composition according to claim 1, wherein said LCP has a melting point of greater than 250° C. and less than 390° C.

8. A composition according to claim 1, wherein the ratio of the wt % of said first polymeric material to the wt % of said LCP is at least 3.5.

9. A composition according to claim 1, wherein the ratio of the wt % of said first polymeric material to the wt % of said LCP is less than 100.

10. A composition according to claim 1, wherein said composition includes at least 35 wt % of said first polymeric material and at least 3 wt % of said LCP.

11. A composition according to claim 1, which includes 80 to 95 wt % of said first polymeric material and 5 to 20 wt % of LCP.

12. A composition according to claim 1 is in an particulate form.

13. A pack comprising a composition according to claim 1.

14. A composite material comprising a composition according to claim 1 and a filler means.

15. A material according to claim 14, wherein said filler means comprises a discontinuous fibrous filler or a non-fibrous filler.

16. A material according to claim 14, wherein said filler means comprises one or more fillers selected from discontinuous glass fibre, discontinuous carbon fibre, carbon black and a fluoro resin.

17. A material according to claim 14 which includes 25 to 69.5 wt % of first polymeric material, 30 to 74.5 wt % of filler means and up to 10 wt % of said LCP.

18. A method of preparing a composition according to claim 1, said method comprising:
 (i) selecting a first polymeric material having a MV of less than 0.15 $kNsm^{-2}$;
 (ii) contacting said first polymeric material with a said LCP;
wherein said first polymeric material and LCP are as described in claim 1.

19. A method according to claim 18 further comprising forming said composition into a particulate form.

20. A method of preparing a composite material according to claim 14, said method comprising:
 (i) selecting a first polymeric material having an MV of less than 0.15 $kNsm^{-2}$ or a composition according to claims 1;
 (ii) optionally, contacting the materials referred to in (i) with a said LCP;
 (iii) contacting said materials referred to in (i) or (ii) with a filler means;
wherein said composition, said first polymeric material, said LCP and said filler means are as described in claims 1.

21. A method of making a component, the method comprising extruding or injection moulding a composite material as described in claim 14.

22. A method of making a component which has a wall which includes a region having a thickness of 3 mm or less, the method comprising:
 (A) selecting a precursor material in the form of a composition or composite material as described in claim 1
 AND
 (B) treating said precursor material thereby to form said component.

23. A composition according to claim 1, wherein the first polymer material has an MV of less than 0.14 $kNsm^{-2}$.

24. A composition comprising at least 30 wt % of a first polymeric material having a melt viscosity (MV) of at least 0.08 $kNsm^{-2}$ and less than 0.13 $kNsm^{-2}$ and at least 1 wt % of a liquid crystal polymer, wherein said first polymeric material is polyetheretherketone.

* * * * *